(12) United States Patent
Lin (10) Patent No.: US 6,620,207 B1
(45) Date of Patent: Sep. 16, 2003

(54) METHOD AND APPARATUS FOR PROCESSING CHINESE TELETEXT

(75) Inventor: Chi Hsuen Lin, Taipei (TW)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/422,743

(22) Filed: Oct. 22, 1999

(30) Foreign Application Priority Data

Oct. 23, 1998 (JP) .......................................... 10-302066

(51) Int. Cl.[7] .............................................. G06F 17/00
(52) U.S. Cl. ............................... 715/536; 704/1; 704/8; 704/9
(58) Field of Search ............................ 715/536; 704/1, 704/8, 9

(56) References Cited

U.S. PATENT DOCUMENTS

| | | | |
|---|---|---|---|
| 4,750,122 A | | 6/1988 | Kaji et al. |
| 5,448,474 A | | 9/1995 | Zamora |
| 6,035,268 A | * | 3/2000 | Carus et al. .................... 704/9 |
| 6,137,911 A | * | 10/2000 | Zhilyaev ..................... 382/225 |
| 6,212,517 B1 | * | 4/2001 | Sato et al. ..................... 707/5 |

FOREIGN PATENT DOCUMENTS

| | | |
|---|---|---|
| JP | 4137167 | 5/1992 |
| JP | 11136644 | 5/1999 |

OTHER PUBLICATIONS

Aitao Chen, Jianzhang He, et al., "Chinese Text Retrieval Without Using a Dictionary," Proceedings of the 20th Annual ACM SIGIR Conference on Research and Development in Information Retrieval, 1997, pp. 42–49.*

Jian–Yun Nie, Martin Brisebois, et al., "On Chinese Text Retrieval," Proceedings of the 19th Annual ACM SIGIR Conference on Research and Development in Information Retrieval, 1996, pp. 225–233.*

"A Survey of Full–Text Data Bases and Related Techniques for Chinese Ancient Documents in Academia Sinica", Ching–chun Hsieh et al., (1997), along with an English abstract.

An English Language abstract of JP 4-137167.

An English Language abstract of JP 11-136644.

* cited by examiner

Primary Examiner—Joseph H. Feild
Assistant Examiner—Charles A. Bieneman
(74) Attorney, Agent, or Firm—Greenblum & Bernstein, P.L.C.

(57) ABSTRACT

Method and apparatus for processing a Chinese teletext. A first reference list contains Chinese characters which rarely form a phrase with an adjacent character. A second reference list contains Chinese characters which are used to divide a sentence and/or form a phrase with an adjacent character. The teletext is divided into character strings using a special symbol and the characters contained in the first reference list. A calculation is performed on the character strings to extract and store Chinese phrases. A density value is derived for each stored Chinese phrase using a statistical formula that represents how often each Chinese phrase appears in the teletext. Phrases having a density value that is equal to or greater than a predetermined value are selected as key phrases for display.

10 Claims, 10 Drawing Sheets

| | | | |
|---|---|---|---|
| 十七課 | 張教授 | 小丑 | 回答 |
| 訪問張教授 | 你有什 | 本書 | 許多關 |
| 張教授 | 話要問 | 燈籠魚 | 魚類 |
| 海底世界 | 儘管問 | 上眞有燈籠 | 知識 |
| 知道 | 不要覺得不 | 燈籠魚 | 要回家 |
| 一位研究魚類 | 意思 | 額頭上 | 時候 |
| 專家 | 壯著膽子問 | 豎著一根杆子 | 星期天 |
| 希望能 | 海底世界 | 杆頂會發光 | 星期天 |
| 認識 | 一種小丑魚 | 像一個燈籠 | 通常都 |
| 勇氣 | 種魚為什 | 燈籠魚 | 不懂 |
| 一封信 | 叫小丑 | 發生興趣 | 趕緊 |
| 訪問 | 小丑魚 | 有耐心 | 星期天 |
| 竟答應 | 頭部 | 不論 | 常常 |
| 星期天早上 | 有一道寬寬 | 問什 | 潛水 |
| 按照地址 | 白色 | 問題 | 給魚照相 |
| 準時 | 像臉上抹白粉 | 都詳詳細細 | 不住 |

Fig.10

CHINESE PHRASE DATA AREA

| CHINESE PHRASE | APPEARING FREQUENCY | LENGTH | SECOND TYPE REFERENCE CHARACTERS | DENSITY VALUE |
|---|---|---|---|---|
| 訪問 | 2 | 4 |  | 128=2*4*4*4 |
| 張教授 | 3 | 6 | 張 | 324=3*6*6*6/2 |
| 海底世界 | 2 | 8 |  | 1024=2*8*8*8 |
| 魚類 | 2 | 4 |  | 128=2*4*4*4 |
| 星期天 | 4 | 6 |  | 864=4*6*6*6 |
| 小丑魚 | 2 | 6 | 小 | 216=2*6*6*6/2 |
| 小丑 | 4 | 4 | 小 | 128=4*4*4*4/2 |
| 燈籠魚 | 3 | 6 |  | 648=3*6*6*6 |
| 燈籠 | 5 | 4 |  | 320=5*4*4*4 |

Fig.11

| DENSITY VALUE | CHINESE PHRASE |
|---|---|
| 01024 | 海底世界 |
| 00864 | 星期天 |
| 00648 | 燈籠魚 |
| 00324 | 張教授 |
| 00216 | 小丑魚 |
| 00128 | 訪問 |
| 00128 | 魚類 |

Fig.12

METHOD AND APPARATUS FOR PROCESSING CHINESE TELETEXT

BACKGROUND OF THE INVENTION

1. Field of the Invention

The present invention relates to a method and apparatus for processing a Chinese teletext using a computer technology, in order to extract key phrases from the teletext existing in a television set or a computer for assisting a user to capture the essential meaning of the teletext.

2. Related Prior Art

Recently, since the computer network, such as Internet, is very popular and numerous teletexts exist in the network, it is an important issue to consider how to rapidly and precisely retrieve desired data through the network.

An existing text retrieval technology enables a user to retrieve desired data or information based on a key word or a phrase. Since such a text retrieval technology does not require a user to remember the sequential number of data, abstract, or complete information, the user can achieve desired data even if the user merely knows incomplete information or a word or phrase.

Generally, the existing text retrieval technology uses a key word or a phrase defined by a user to search a database for retrieving all data associated with the key word or phrase. The existing Chinese text retrieval technology is based on the logic of a syntax in a Chinese text rather than the logic of a syntax of a foreign language and is a well known word processing technology available in commercial market. Such a text retrieval technology is characterized in that data associated with the key word or phrase inquired by the user can be automatically retrieved. Such a technology is merely effective for retrieving data within a finite database using a key word or phrase entered by the user, but not effective for the situation when the user cannot know whether the key phrases have essential meaning in a desired text. If the key word or phrase entered by the user is improper, the retrieved data will be incorrect or incomplete and thus a new key word or phrase has to be conceived and entered for performing the searching operation again.

Such a phenomenon requiring repeated execution of searching operation is due to the huge size of normal database that make users unable to know the complete content of the database and conceive an effective key word or phrase.

Thus, if the user can really know several key phrases about a teletext, the essential meaning of the teletext can be understood. If a text retrieval system can incorporate the method according to this invention for extracting key phrases in the teletext being currently processed, the user can almost know the essential content of the teletext before really reading the teletext. If the extracted phrases are used to acquire detailed descriptions in the teletext, the important portion of the content in the teletext can be rapidly displayed.

In the prior text retrieval technology, if the user cannot knows what the exact key phrase is, it will consume considerable time to perform the searching operation by using an assumed key phrase. If the user can achieve the actual key phrase regarding a desired text in advance, the user can easily capture essential content of the text.

Therefore, the requisitions for utilizing a prior text retrieval system are as follows:

The data to be retrieved is restricted to some specific fields, in other words, in a closed environment; and The user can not enter a specific phrase or word for executing the searching operation, unless he/she in advance knows about the desired data to a certain extent before performing a searching operation.

A well known text retrieval system, "Chinese Text Retrieval System", proposed by ACADEMIA Sinica, for example, is only adapted to survey data regarding the Chinese literature and history field, and requires an associated index phrase for retrieving desired data. Additionally, this Chinese Text Retrieval System can be applied to survey data in the Bible by entering a person's name or phrases about an allusion, and automatically displays the associated data. However, such a text retrieval method will result in serious time consumption in a network having unlimited data fields. Since it is difficult to retrieve the desired data if the user does not know about the context of a text, normally a presumed phrase is used to survey a title but another possible index phrase will be considered for next search if the desired data cannot be retrieved based on the previous presumed phrase.

SUMMARY OF THE INVENTION

In the light of the above problems, this present invention provides a method for processing a teletext. The processing method according to this invention comprises the steps of generating a first reference list in a memory storing a plurality of Chinese characters which rarely form a phrase with an adjacent character in a Chinese text; generating a second reference list in the memory storing a plurality of Chinese characters which are sometimes used as conjunction and sometimes form a phrase with an adjacent character in a Chinese text; inputting a teletext; dividing the inputted teletext into respective character strings by using special symbols and the characters contained in the first reference list as separation reference for dividing a sentence in the teletext; performing calculation on the character strings in a statistic manner to extract the character strings containing two or more Chinese characters as Chinese phrases and storing the Chinese phrases into a Chinese phrase data area; checking the Chinese phrases stored in the Chinese phrase data area by the characters in the second reference list to delete a phrase unsuitable to be a meaningful phrase from the Chinese phrase data area; deriving the density value of each of the Chinese phrases stored in the Chinese phrase area using a statistic formula calculating the frequency of the Chinese phrases, the number of characters and the number of the second reference characters contained in the Chinese phrase, the frequency of the Chinese phrase indicating the times of the Chinese phrase appearing in the teletext; and selecting a plurality of phrases having higher density values as key phrases and outputting the selected key phrases for displaying.

In addition, this present invention provides an apparatus for processing a teletext. The apparatus according to the present invention comprises a memory means for storing a first reference list and a second reference list, the first reference list storing a plurality of Chinese characters which rarely form a phrase with an adjacent character in a Chinese text, the second reference list storing a plurality of Chinese characters which are sometimes used as conjunctions and sometimes form a phrase with an adjacent character in a Chinese text; an inputting means for inputting a teletext; a processor for executing the processing operations including: inputting the teletext from the inputting means, dividing the inputted teletext into respective character strings by using special symbols and the characters contained in the first reference list as separation reference for dividing a sentence in the teletext, perform calculation on the character strings in a statistic manner to extract the character strings containing two or more Chinese characters as Chinese phrases and storing the Chinese phrases into a Chinese phrase data area, checking the Chinese phrases stored in the Chinese phrase data area by the second reference characters to delete a phrase unsuitable to be a meaningful phrase from the Chinese phrase data area, deriving the density value of each of the Chinese phrases stored in the Chinese phrase area by suing a statistic formula calculating the frequency of the Chinese phrases, the number of characters and the number of the second reference characters contained in the Chinese phrase, the frequency of the Chinese phrase indicating the times of the Chinese phrase appearing in the teletext, selecting a plurality of phrases having higher density values as key phrases and outputting the selected key phrases for displaying; and a display means for receiving and displaying the key phrases output from the processor.

The method and apparatus for processing the teletext according to this invention have the following improved effects and advantages:

This invention enables a user to rapidly capture the meaning of a Chinese teletext from a Internet providing infinite information resources and speeds the processing of mass Chinese teletexts.

This invention is particular advantageous for the digital television. It can enable the user to acquire key Chinese phrases from a mass of Chinese information provided by the digital television in a simple manner such that time required for achieving information can be reduced and the user does not have to read the content of the information in a detail unless it is necessary.

In the text retrieval field, this invention can acquire key phrases to provide key phrases required by a text retrieval system.

BRIEF DESCRIPTION OF THE DRAWINGS

The invention will be described in further detail in the following by means of preferred embodiments with reference to the accompanying drawings, in which.

DESCRIPTION OF THE PREFERRED EMBODIMENTS

Embodiments of the present invention will now be described.

<First Embodiment>

Figure 1:
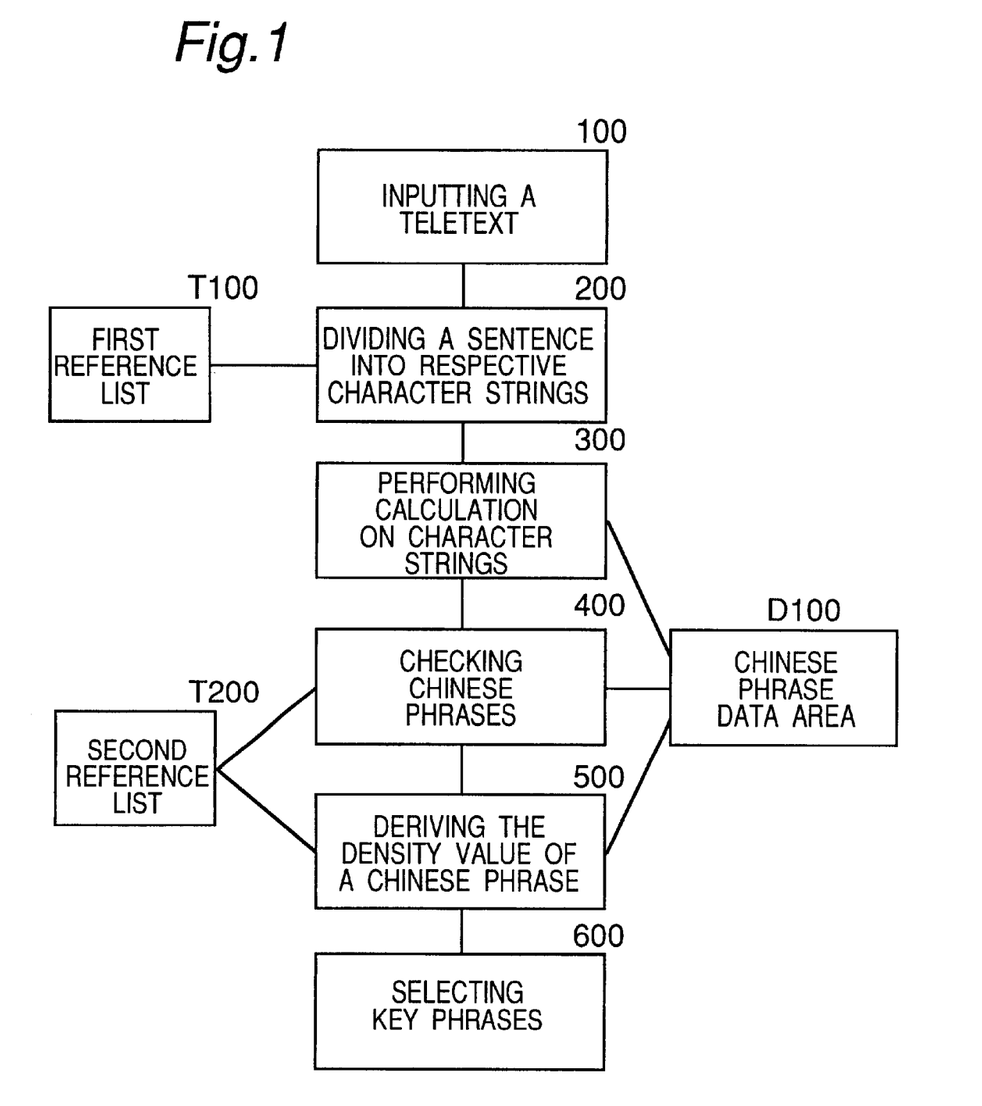
FIG. 1 is a block diagram illustrating the operation for processing a Chinese teletext according to the first embodiment of the present invention.
Figure 6:
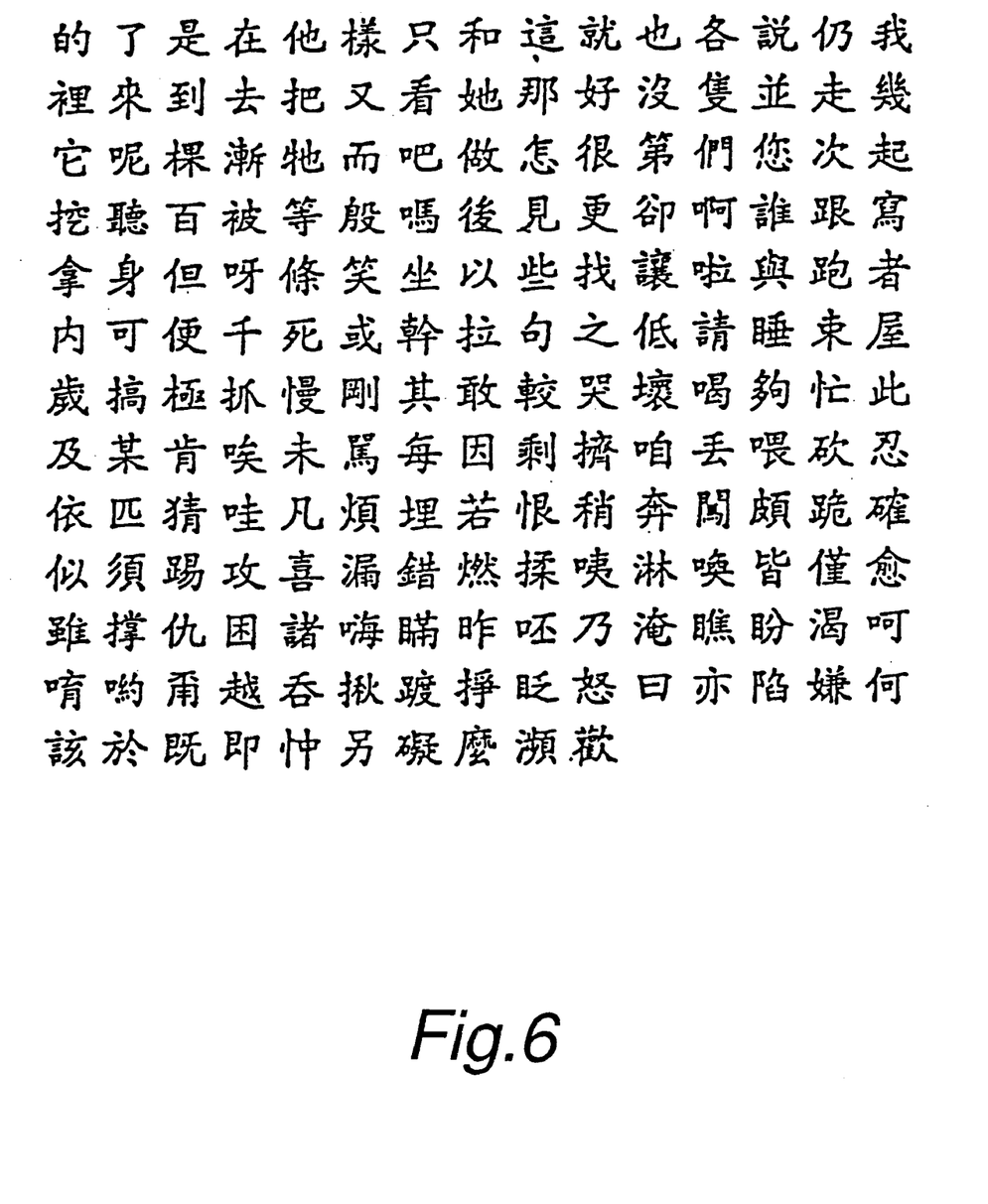
FIG. 6 shows an example of reference characters contained in the first reference list and used in the first embodiment according to the present invention.

FIG. 1 is a block diagram illustrating the operation for processing a Chinese teletext according to the first embodiment of the present invention. As shown in FIG. 1, this process comprises procedure 100 for inputting a teletext, procedure 200 for dividing a sentence, procedure 300 for performing calculation on character strings acquired in procedure 200, procedure 400 for checking Chinese phrase, procedure 500 for deriving the density value of a Chinese phrase, and procedure 600 for selecting a key phrase. Moreover, each of first reference list T100 and second reference list T200 includes Chinese characters used as a separation reference for dividing a sentence. The first reference list T100 contains first reference characters, such as those shown in FIG. 6. Generally, the first reference list T100 is stored in a memory such as hard disc, a floppy disk and ROM(Read Only Memory). Statistically, the first reference characters contained in the first reference list most frequently appear in a Chinese text and rarely form a meaningful phrase with adjacent Chinese characters. According to this embodiment, the first reference characters are used as separation references for dividing a sentence. The second reference list T200 contains second references characters as those shown in FIG. 7. The second reference list is also stored in a memory such as hard disc, a floppy disk and ROM(Read Only Memory). The second reference characters contained in the second reference list are sometimes used as separation references for dividing a sentence, and sometimes constitute a meaningful phrase with adjacent Chinese characters. For instance, since the character, "自", in the short sentence, "自去年開始", does not form any meaningful phrases with adjacent characters, this character can be used as a separation reference, but this character, "自", in the short sentence "打開自來水開關", is one character forming the meaningful phrase, "自來水".

In addition, during the process of the Chinese teletext, the Chinese character data area D100 temporarily stores Chinese phrases, appearing frequency and length of a Chinese phrase, and the existing second reference characters which are used to derive the density value.

Procedure 100 inputs a teletext from a network such as Internet or a hard disk of a local computer and then stores the inputted teletext into the memory of a system.

Thereafter, procedure 200 can divide the inputted teletext into respective character strings by using reference characters contained in the first reference list T100 and special symbols as separation reference for dividing a sentence.

Figure 2:
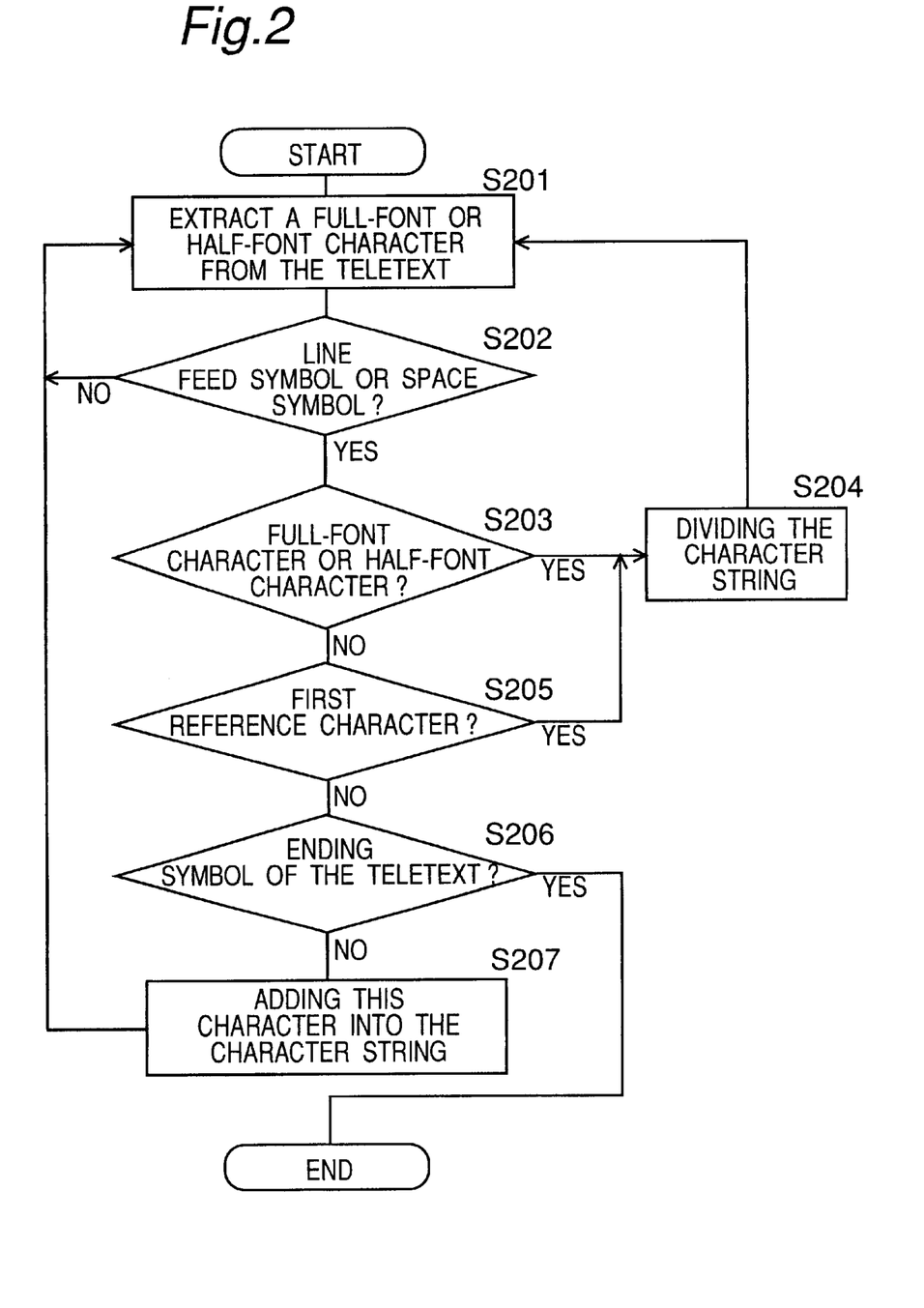
FIG. 2 is a flow chart illustrating the dividing procedure for dividing sentences according to the first embodiment of the present invention.

FIG. 2 illustrates a flow chart explaining the procedure 200 according to the first embodiment, which divides the inputted teletext into respective short sentences. As shown in FIG. 2, a "full-font" or "half-font" character is fetched from the inputted teletext stored in memory at step S201. The "full-font" character refers to a Chinese character or a special symbol consisting of two bytes in which the value of the first byte is greater than 128, whereas the half-font character refers to an English Character or special symbol containing one byte whose value must be less than 127. And then, this procedure proceeds with step S202 to determine whether the fetched character is a line feed symbol or space symbol. If the character is one of these two symbols, the character is ignored and characters in front of and behind it are joined since each of the two symbols is normally used for alignment in editing a text rather than used as a separation references in dividing a sentence in the processing method according to the first embodiment of this invention, and then the procedure 200 is returned to steps S201 to process the next character. If the character is not a line feed or space symbol, an then the procedure 200 continues the next step S203 in which a determination is made whether the fetched character is a half-font character or a full-font special symbol. If it is, then the procedure 203 advances to step S204 to perform dividing operation on the Chinese character string consisting of characters previously processed. If it is not, then the next step S205 is executed to perform the operation for the first reference character. In step S205, a determination is made whether the fetched character is identical to one of the first reference characters contained in the first reference list. If the fetched character is a first reference character, then the procedure 205 returns to step S204 to perform the dividing operation. If the fetched character is not a first reference character, then this character is considered as a normal character and added to a character string and then the length of the character string is incremented by one. Then, the procedure returns to step S201 to process the next character. In step 204, the operation for dividing a sentence is performed. If a character string acquired in this step S204 only contains one character, then the character string is given up because it can not form a key phrase. If the character string has more than one character, then this character string is stored into a Chinese phrase data area for the later phrase comparison procedure.

Now, a detailed description is given to the procedure 300.

Procedure 300 compares respective character strings achieved in procedure 200 with each other to find out a character strings containing two or more consecutive characters which are considered as Chinese phrase.

Figure 3:
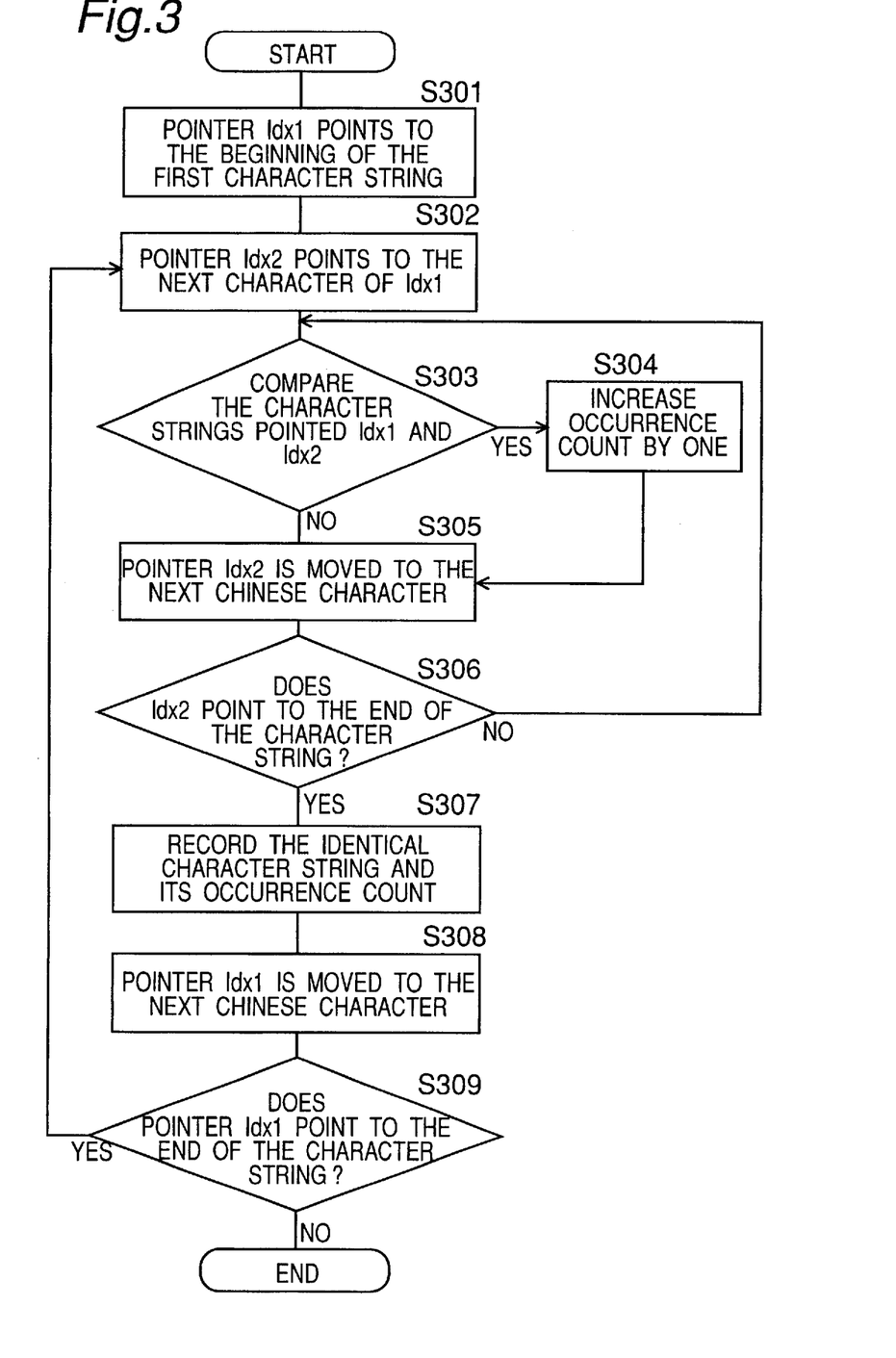
FIG. 3 is a flow chart illustrating the procedure for calculating character strings according to the first embodiment of the present invention.

FIG. 3 illustrates a flow chart explaining the operation of Procedure 300. As shown in FIG. 3, the contents of respective character strings are compared to find any of the identical character string, and to calculate the number of characters of the identical string and to increase its times by one to update appearing frequency. First, the initial position of a first recursive pointer Idx1 is pointed to the beginning of the first character sting in step S301. Subsequently, the operation advances to step S302 at which when the pointer Idx1 is pointed to the position of a character string, the initial position of a second recursive pointer Ixd2 is positioned to the next character after Idx1. Recursive operation using Idx2 is performed on all character strings to acquire the Chinese character stings identical to those pointed by Idx1 and appearing frequency of the identical Chinese character string. At step S303, the Chinese character strings pointed by Idx1 are compared with those pointed by Idx2 to determine whether they are identical to each other. At step S304, a calculation is performed to acquire the number of the identical phrases pointed by Idx1 and Idx2. Idx2 pointer is moved to the next Chinese character, at step S305. At step S306, a determination is made whether the pointer Idx2 is pointed to the end of the final character string. If it is, the recursive operation of the pointer Idx2 is terminated. If it is not, the operation returns to step S303 for performing the comparison of the next character strings. At step S307, the content and appearing frequency of the Chinese character are registered in the Chinese phrase data area D100. At step S308, the pointer Idx1 is moved to the next Chinese character. At step S309, a determination is made whether the pointer is pointed to the end of the final character string. If it is, the recursive operation is terminated and the operation for searching all Chinese characters is completed. If it is not, the operation returns to step S302 to perform another recursive operation by the pointer Idx2.

Procedure 400 checks thus extracted character strings in procedure 300 based on the second reference list T200. If all of the characters contained in the extracted character string are the second reference characters, then the character string is deleted because it is not adapted to be a key phrase.

Figure 4:
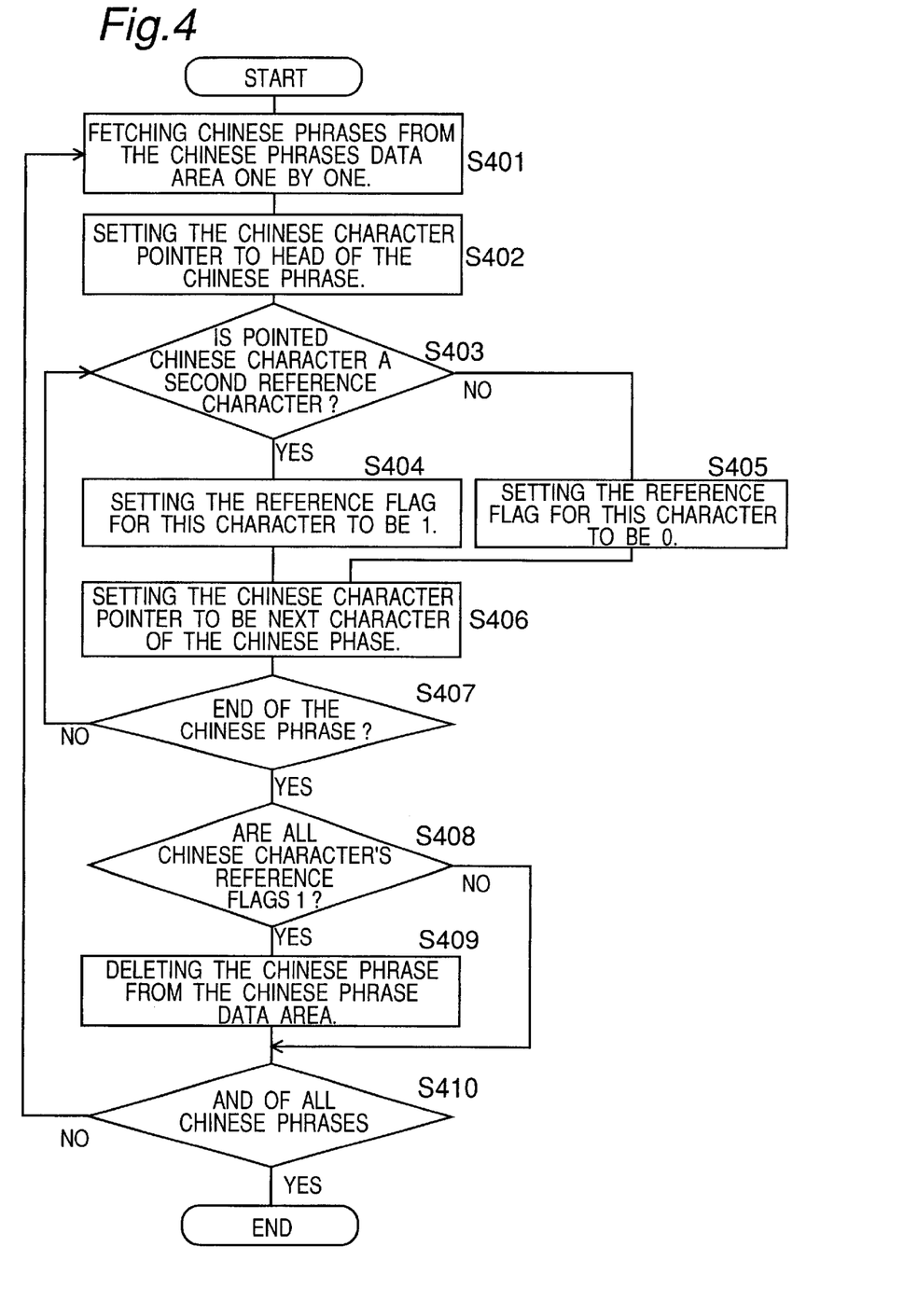
FIG. 4 is a flow chart illustrating the procedure for checking Chinese phrases according to the first embodiment of the present invention.

FIG. 4 is a flow chart illustrating the procedure 400. All the Chinese phrases, extracted in the procedure 300 and stored in the Chinese phrase data area D100, will be checked to delete the conjunctions which can not be considered as key phrases. For example, Chinese characters, "将" and "能", are the second reference characters, wherein the character "将" can exist in the phrase "将軍" and the character "能" can exist in a phrase "熱能", but if these two character are conjoined together to form a conjunction "将能", then such a conjunction can not be considered as a key phrase. At step S401, the Chinese phrases are fetched from the Chinese phrase data area D100, one by one. At step S402, the Chinese character pointer is set to head of a fetched Chinese phrase. Based on the second reference list, each of the characters in the fetched Chinese phrases is checked to determine whether it is a second reference character or not from S403 to S407. At step S403, the pointed Chinese Char of the Chinese phrase is checked whether it is a second reference char. If the checked Chinese char is a second reference char, then at step S404, a reference flag for this character is set to be 1. If it is not, at step S405, the reference flag for this character is set to be 0. At step S406, the Chinese character pointer is set to next Chinese char of the Chinese phrase. At step S407, if the Chinese phrase is not ended, then go back to step S403 for next Chinese char. If it is ended, then go to step S408 for checking. At step S408, all reference flags of the Chinese phrase are checked. If all reference flags are 1, then at step S409, the Chinese phrase will be determined as a conjunction and deleted from the Chinese phrase data area D100. Subsequently, at step S410, if there exists next Chinese phrase in the Chinese phrase data area D100, then the procedure is returned to step S401 to perform the same operation for the next Chinese phrase. If it is not, the procedure 400 will be ended.

Figure 5:
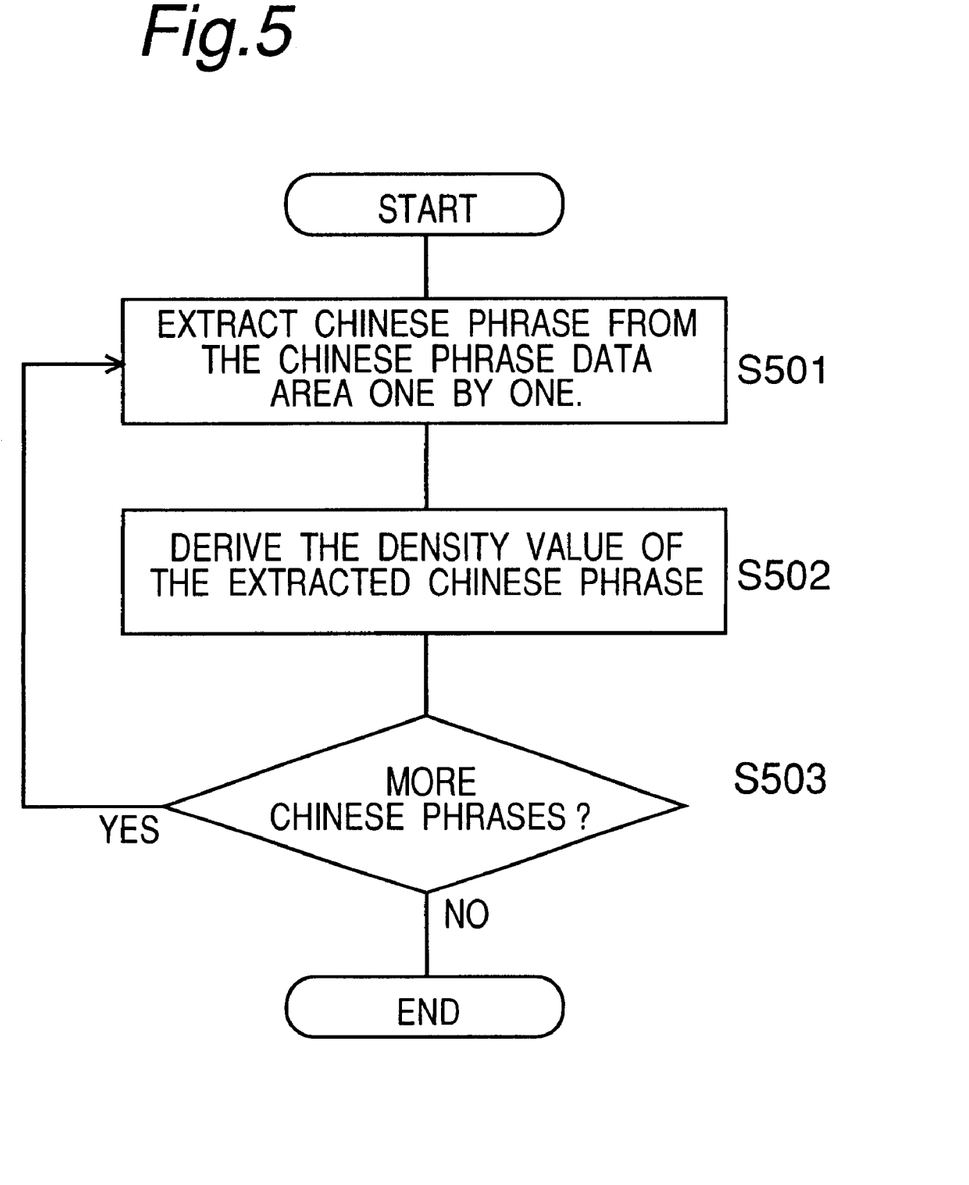
FIG. 5 is a flow chart illustrating the procedure for deriving the density value of a Chinese phrases according to the first embodiment of the present invention.

Procedure 500 for statistically deriving the density value of Chinese phrase based on the length, appearing frequency (times in the text), and the number of the second reference characters of each of the Chinese phrases checked in the procedure 400. The important degree of each phrase in the text can be acquired and the key phrases for the text can be determined by this deriving operation. FIG. 5 is a flow chart illustrating the operation of the procedure 500. As shown in FIG. 5, the Chinese phrases are fetched from the Chinese phrase data area D100 one by one, at step S501. At step S502, the density value of the Chinese phrase is derived by the following calculation method.

dense=times*word_len*word_len*word_len/second_reference_num If word_len>8, then set word_len=8 wherein
dense: density value;
times: the appearing frequency of a Chinese phrases in a teletext;
word_len: the length of the Chinese phrase in which the length of each Chinese Character is two bytes.
second_reference_num: the number of the second reference characters contained in the Chinese phrase.

The appearing frequency of the Chinese phrase is proportional to the density value of the Chinese phrase. In other words, the higher the appearing frequency of the Chinese phrase is, the more important the Chinese phrase is in the text. The cube of the length of the Chinese phrase is proportional to the density value. In other words, the more characters the Chinese phrase has, the more important it is in the text. But if a Chinese phrase has more than four characters, the length of the phrase is insignificant. Accordingly, a phrase consists of more than 8 bytes is processed as 8 bytes. Moreover, if the Chinese phrase has more second reference characters, the density value will be further decreased. This is because the second reference character is sometimes used as an adjective or conjunction. At step S503, a determination is made whether any other Chinese phrases is not processed yet. If it is yes, then the procedure returns to S501 and continues the same calculation for the next Chinese phrase. If it is no, then the procedure is end.

In the procedure 600, based on the number of key phrases specified by a user (N), phrases having the higher N density values are set as key phrases. Procedure 600 performs an sorting operation for sorting the density values of the Chinese phrases in a descending order by value. The phrase having the higher density value represents that it is more important in the text and has significance enough to indicate the essential meaning of the context. Moreover, the repetitive phrases are deleted to prevent repetitive key phrases. For example, if the density value of a phrase "辦公室" is greater than that of the other phrase "辦室", the phrase "辦公" will be deleted to prevent both phrases "辦公室" and "辦公" from being considered as the key phrases. Then, several phrases having the higher density value are selected as the key phrases and are displayed on the screen, whereby the user can know the essential meaning of the context.

Now, an exemplary processing operation will be given to further explain the operation according to the first embodiment of this invention.

Figure 8:
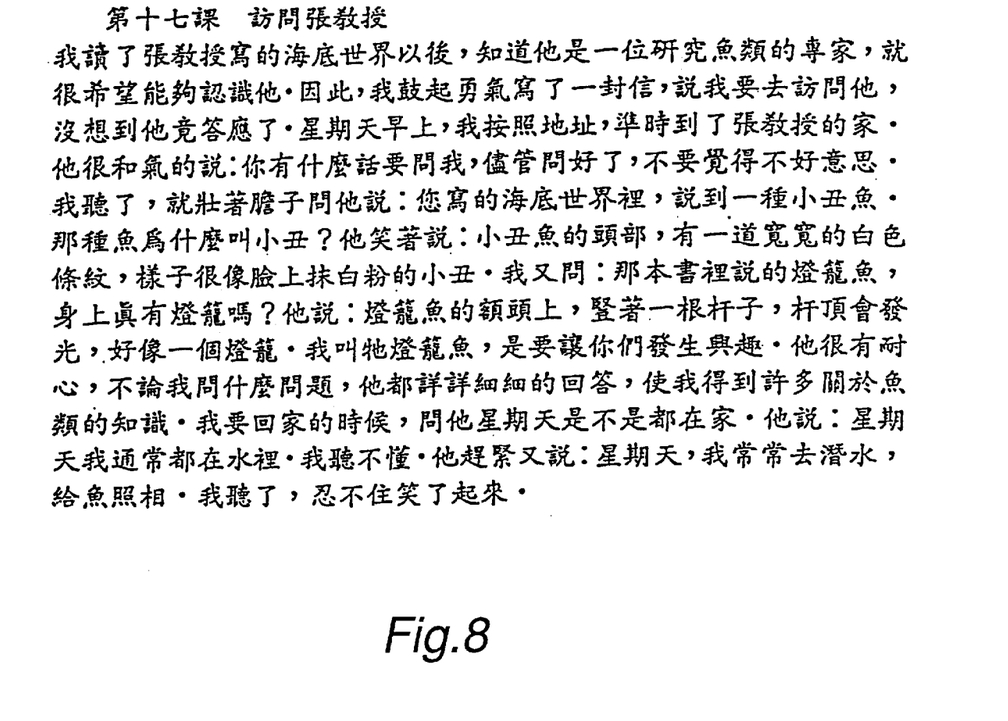
FIG. 8 shows an exemplary Chinese teletext processed in the first embodiment according to the present invention.
Figure 9:
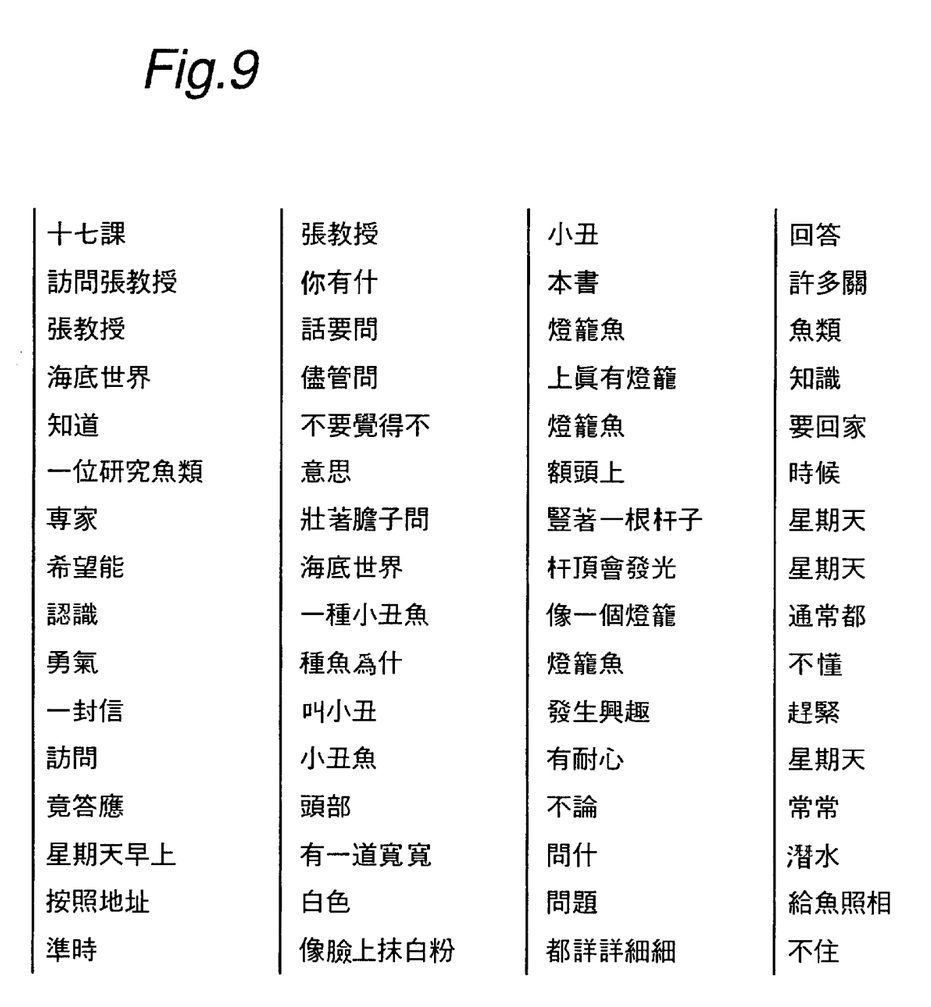
FIG. 9 shows character strings achieved by processing the Chinese teletext shown in FIG. 8.
Figure 10:
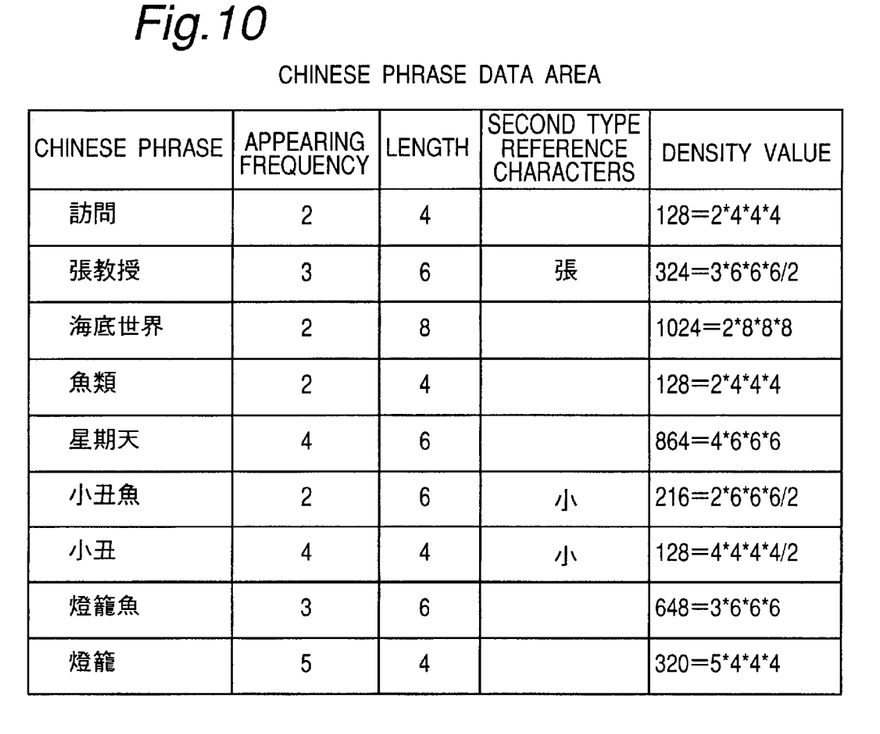
FIG. 10 shows the statistic data about the Chinese teletext shown in FIG. 8.

An exemplary text is shown in FIG. 8. This text is read into a system memory by the procedure 100. Then, the whole text is divided into respective character strings having more than one character by the procedure 200 using the first reference characters shown in FIG. 6 and special symbols such as full-font symbols and half-font symbols as the separation reference. The character strings extracted in the above procedure are shown in FIG. 9. For example, to divide the beginning of the sample text, "我讀了張教授寫的海底世界以後知道他是一位研究魚類的專家", the dividing operation in this invention is performed to extract the first reference characters, "我了寫的以後", "他", and "是", and a special full-font symbol """, and several divided phrases, "讀", "張教授", "海底世界", "知道", "一位研究魚類", and "專家". Because the character string "讀" contains only one character, this character string is deleted. Thus, the resultant character string are "張教授", "海底世界", "知道", "一位研究魚類", and "專家". Subsequently, all of the resultant character strings are compared with each other in a recursive manner to extract the character string containing two or more characters. The extracted character strings are called Chinese phrases and then are stored into the Chinese phrase data area shown in FIG. 10 which also records appearing frequency, the length of phrase and the second reference character regarding the Chinese phrase stored therein. The density value of these phrases are derived based on the above calculation rule for density value. The derived values are shown in the rightmost column of FIG. 10.

Figure 7:
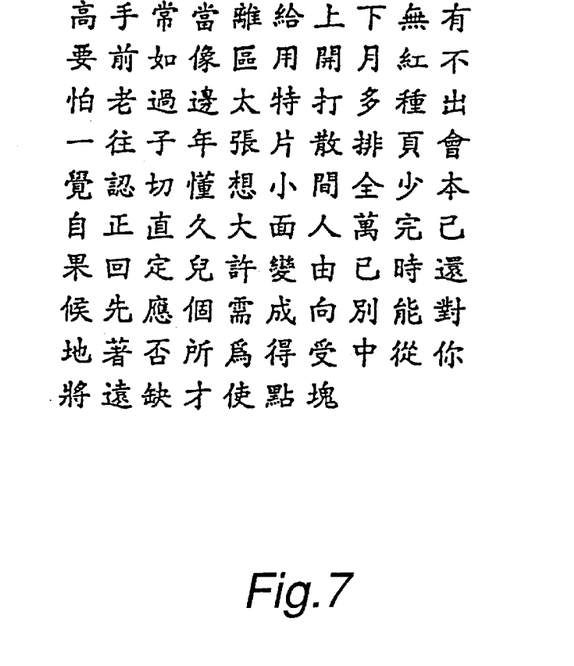
FIG. 7 shows an example of reference characters contained in the second reference list and used in the first embodiment according to the present invention.
Figure 11:
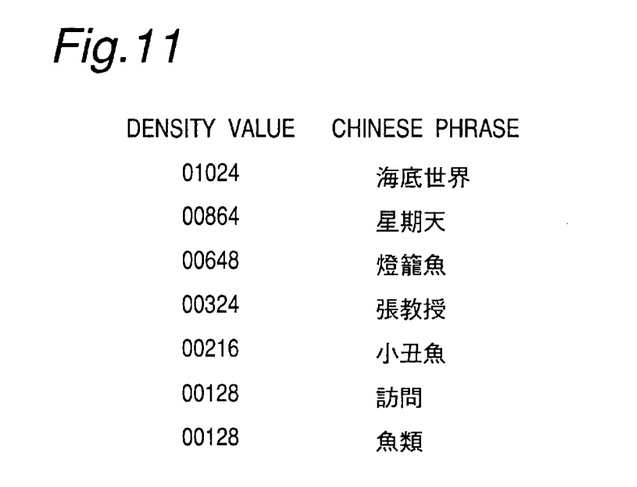
FIG. 11 shows the key phrases acquired from the Chinese teletext shown in FIG. 8 by the first embodiment according to the present invention.

Since characters, "張", "小" are the second reference characters shown in FIG. 7, the density values of the phrases containing any one of these two characters should be divided by two. Since the phrases, "小丑魚" and "小丑", and "燈籠" and "燈籠魚", are repetitive, the phrases having lower density values are deleted. And then, the remaining phrases are sorted in descending order by the density value and the sorting result is shown in FIG. 11. Finally, these resultant phrases are shown in a display device.

<Second Embodiment>

Figure 12:
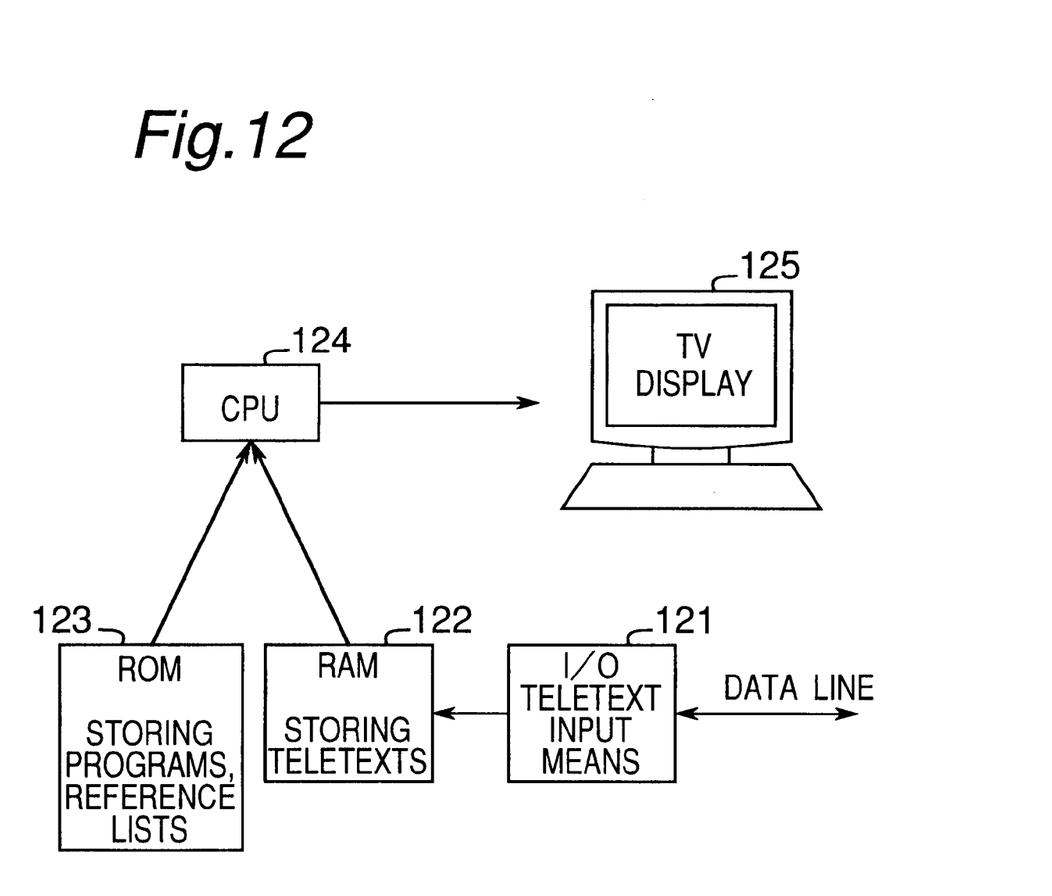
FIG. 12 is a block diagram illustrating an apparatus for processing a Chinese teletext according to the second embodiment of the present invention.

FIG. 12 is a block diagram illustrating an apparatus for processing a Chinese teletext according to the second embodiment of the present invention.

As shown in FIG. 12, a teletext is inputted to the input/output means 121 through a data line. The inputted teletext is stored into the RAM122(Random Access Memory). The R0M123(Read Only Memory) stores a program for performing the processing operations described in the first embodiment. The CPU(Central Processing Unit)124 executes the program to process the inputted teletext and outputs key phrases acquired by the execution of the program to the display means125.

The drawings and the associated embodiments are used only as illustrating the invention. The invention may vary in its details within the scope and spirit of the appended claims. For instance, the characters contained in the first reference list and the second reference list and the calculation rule for density value can be appropriately varied depending on the features of texts.

What is claimed is:

1. A Chinese teletext processing method for automatically extracting and displaying a key phrase in the teletext to aid a user to capture an essential meaning of the teletext, comprising:

generating a first reference list in a memory that stores a plurality of Chinese characters which rarely form a phrase with an adjacent character in a Chinese text;

generating a second reference list in the memory that stores a plurality of Chinese characters which are sometimes used as separation references for dividing a sentence and sometimes form a phrase with an adjacent character in a Chinese text;

inputting a teletext;

dividing the inputted teletext into respective character strings using a special symbol and the characters contained in the first reference list as separation references for dividing a sentence in the teletext;

performing a calculation on the character strings in a statistical manner to extract character strings containing at least two Chinese characters as Chinese phrases and storing the Chinese phrases into a Chinese phrase data area;

checking the Chinese phrases stored in the Chinese phrase data area by the second reference characters to delete a non-meaningful phrase from the Chinese phrase data area;

deriving a density value of each Chinese phrase stored in the Chinese phrase area using a statistical formula that calculates a repetitive frequency of the Chinese phrase, a length of the Chinese phrase and a number of the second reference characters contained in the Chinese phrase, the repetitive frequency of the Chinese phrase representing how often the Chinese phrase appears in the teletext; and selecting a plurality of phrases having density values at least equal to a predetermined value as key phrases and outputting the selected key phrases for displaying.

2. The processing method of claim 1, wherein the special symbol comprises at least one of a punctuation mark, a foreign character, a table symbol, a graph symbol, an arrow symbol, and any symbol other than a Chinese character.

3. The processing method of claim 1, wherein performing a calculation on the character string comprises comparing the respective character strings character by character, and storing identical character strings having at least two Chinese characters into the Chinese phrase data area in response to the comparison.

4. The processing method of claim 3, wherein the Chinese phrase data area further comprises storing a frequency and length of the respective Chinese phrases.

5. The processing method of claim 1, wherein selecting a plurality of phrases comprises sorting the density values of the Chinese phrases in a descending order, and deleting repetitive Chinese phrases.

6. An apparatus for processing a teletext, comprising:

a memory that stores a first reference list and a second reference list, said first reference list storing a plurality of Chinese characters which rarely form a phrase with an adjacent character in a Chinese text, said second reference list storing a plurality of Chinese characters which are sometimes used as separation references for dividing a sentence and sometimes form a phrase with an adjacent character in a Chinese text;

an inputter that inputs teletext;

a processor that executes a processing operation, said processing operation including:

receiving the teletext input via the inputter;

dividing the inputted teletext into character strings using special symbols and the characters contained in the first reference list as a separation reference that divides a sentence in the teletext;

performing a calculation on the character strings in a statistical manner to extract character strings containing at least two Chinese characters as Chinese phrases and storing the Chinese phrases into a Chinese phrase data area;

checking the Chinese phrases stored in the Chinese phrase data area using the second reference characters to delete non-meaningful phrases from the Chinese phrase data area;

calculating a density value of each Chinese phrase stored in the Chinese phrase area using a statistical formula that calculates a repetitive frequency of the Chinese phrase, a length of the Chinese phrase and a number of the second reference characters contained in the Chinese phrase, the repetitive frequency of the Chinese phrase indicating how often the Chinese phrase appears in the teletext; and selecting a plurality of phrases having density values at least equal to a predetermined value as key phrases, and outputting the selected key phrases; and a display that displays the selected key phrases output from the processor.

7. The apparatus of claim 6, wherein the special symbols comprise at least one of a punctuation mark, a foreign character, a table symbol, a graph symbol, an arrow symbol, and any symbol other than a Chinese character.

8. The apparatus of claim 6, wherein the character strings are extracted based upon a character by character comparison, identical character strings having at least two Chinese characters being stored in the Chinese phrase data area in accordance with the comparison.

9. The apparatus of claim 8, wherein the Chinese phrase data area further includes the repetitive frequency and length of the respective Chinese phrases.

10. The apparatus of claim 6, wherein said processor sorts the density values of the Chinese phrases in a descending order and deletes repetitive Chinese phrases.

* * * * *